United States Patent [19]
Zimmermann

[11] Patent Number: 5,934,870
[45] Date of Patent: Aug. 10, 1999

[54] STEAM TURBINE CONTROL UTILIZING A WATER HYDRAULIC DRIVE

[75] Inventor: Achim Zimmermann, Mülheim, Germany

[73] Assignee: GHH BORSIG Turbomaschinen GmbH, Oberhausen, Germany

[21] Appl. No.: 08/925,889

[22] Filed: Sep. 8, 1997

[30] Foreign Application Priority Data

Sep. 10, 1996 [DE] Germany .......................... 196 36 674

[51] Int. Cl.⁶ ...................................................... F01B 25/02
[52] U.S. Cl. .......................... 415/157; 415/202; 251/282; 251/63
[58] Field of Search .................................... 415/150, 151, 415/155, 157, 159, 165, 202; 251/63, 282; 137/599

[56] References Cited

U.S. PATENT DOCUMENTS

| | | |
|---|---|---|
| 3,518,032 | 6/1970 | DeGroff et al. .......................... 417/440 |
| 4,167,262 | 9/1979 | Lemmon .................................... 251/25 |
| 4,679,769 | 7/1987 | Dawawala et al. ...................... 251/282 |
| 4,834,133 | 5/1989 | LaCoste et al. ......................... 137/315 |
| 4,850,394 | 7/1989 | Imhof et al. ............................ 137/554 |

*Primary Examiner*—Thomas E. Denion
*Assistant Examiner*—Rhonda Barton
*Attorney, Agent, or Firm*—McGlew and Tuttle

[57] ABSTRACT

A steam control valve is provided with a valve core arranged in the valve housing (10), with an upper valve spindle (5) guided in a sealing packing (12), with a valve cone (1) sliding in a lower and upper valve core (3b) and (3a), and with a valve diffusor (6) arranged in the valve housing (10). Piston rings (4a) are inserted in the upper part (1a) of the valve cone (1) sliding in the valve core upper part (3a), and piston rings (4b) are inserted in the lower part (1c) of the valve cone (1) sliding in the valve core lower part (3b). Clean water is used as the hydraulic fluid for the hydraulic drive attached to a connection spacer (15). At least one axial hole (2) is provided in the valve cone (1). With the upper part (3a) and the lower part (3b) of the valve core (3), the middle part (1b) of the valve cone forms an annular chamber (8), at which at least one suction channel (9) is arranged.

10 Claims, 2 Drawing Sheets

STEAM TURBINE CONTROL UTILIZING A WATER HYDRAULIC DRIVE

FIELD OF THE INVENTION

The present invention pertains to a steam turbine steam control valve with a valve core arranged in the valve housing, with a valve spindle guided in a packing sealing, with a valve cone sliding in the valve core, and with a valve diffusor arranged in the valve housing and with a hydraulic drive.

BACKGROUND OF THE INVENTION

Pressure-equalizing steam control valves for steam turbines, which are designed as single-seat or double-seat valves and are actuated by means of oil hydraulic drives, have been known.

The double-seat valve is pressure-equalized as a consequence of the back-to-back arrangement of two valve disks or cones, so that no appreciable opening forces are generated from the steam pressure in the closed state of the valve as a consequence of the minimum differential pressure acting on the valve.

Since the hydraulic drives may consequently be smaller, the force for displacing the oil during the closing process is weaker as well, and since the cross section of the valve spindle may also be smaller because of the weaker adjusting forces, the spindle lift is also smaller in the opened state of the valve, and the pretension of the closing spring may be weaker. This means that the forces necessary for actuating a double seat valve are relatively weak.

However, the double seat valve is almost never sealed for technical reasons. This is due, on the one hand, to the redundancy in the dimensioning of the distance between the two valve seats, and, on the other hand, to the thermal expansions of the valve housing and the valve spindle with the two integral valve disks not being exactly equal.

In the prior-art single-seat valve of piston design, the same pressure that prevails behind the valve when viewed in the direction of flow is admitted to the rear side of the valve, as in the present invention.

However, the cross-sectional area of the valve spindle is eliminated for a complete pressure equalization due to the necessity to connect the valve spindle on the rear side of the valve cone. As in the double seat valve, the cross section of the valve spindle may be smaller than in the case of a valve without pressure equalization. The closing spring may also be installed with a weaker pretension because of the resulting reduction in the spindle lift, i.e., the forces necessary for actuating the valve are weak, as in the double-seat valve.

The valve cone designed as a piston is necessarily sealed against the valve core designed as a bushing. However, the steam leaking via this sealing ring (sealing rings) flows to the blading of the turbine via the pressure-equalizing holes in the valve cone. This may lead to an unintended startup of the turbine at high steam pressures.

The oil-hydraulic drives of the prior art steam control valves are now always arranged outside the area of hot turbine parts for reasons of fire safety. This is to avoid the risk of a oil fire (hydraulic fluid fire). This means that valves and drives must be arranged under the turbine, or that if the valves are arranged above the turbine, the hydraulic drives must be at a remote location and provide their function via levers and deflections.

SUMMARY AND OBJECTS OF THE INVENTION

The primary object of the present invention is to develop a steam control valve, which requires minimal adjusting forces, is sealed in the closed state, and can be arranged, along with its drive, above the turbine without the risk of oil fire, which occurs in the case of oil-hydraulic drives.

Furthermore, the valve, including its hydraulic drive, must be able to be arranged in any installed position, i.e., even in the hanging position under the turbine.

According to the invention, a steam control valve is provided with a valve core arranged in the valve housing, with an upper valve spindle guided in a sealing packing, with a valve cone sliding in a lower and upper valve core and, and with a valve diffusor arranged in the valve housing. Piston rings are inserted in the upper part of the valve cone sliding in the valve core upper part, and piston rings are inserted in the lower part of the valve cone sliding in the valve core lower part. Clean water is preferably used as the main component of the hydraulic fluid for the hydraulic drive attached to a connection spacer. At least one axial hole is provided in the valve cone. With the upper part and the lower part of the valve core, the middle part of the valve cone forms an annular chamber, at which at least one suction channel is arranged.

According to the present invention, the valve comprises a valve cone, which is provided with two or more axial holes, so that the same pressure prevails under and above the valve cone. The valve cone is guided in a valve core and is sealed against same with upper and lower piston rings.

The valve cone diameter above and below are dimensioned such that the upper cone area to which steam is admitted corresponds to the area of the underside of the cone, taking the spindle cross section into account. The valve cone is thus at equilibrium considering the forces of pressure acting on it from above and below. As a consequence of this equilibrium, the adjusting forces for the valve are weak, so that the spindle diameter can be made small. The spindle is sealed against the valve core with a packing gland.

The forces to be overcome during the adjustment of the control valve result only from the friction of the piston rings and from the friction in the packing gland, which is low because of the small spindle diameter, and from a spring, which acts in the closing direction and may be arranged in or below the hydraulic drive, and ultimately from the lift, which originates from the pressure in the annular suction chamber on the different, chamber-forming annular surfaces of the valve cone in conjunction with the valve core.

To avoid the leakage of steam with the control valve closed (the valve cone is seated on the valve diffusor) via the piston rings and the axial holes, the valve cone is provided with a turned groove, which forms a chamber with the upper and lower valve cores. Leaking steam is suctioned from this chamber via one or more channels, which are arranged in the valve core, to an atmospheric or lower pressure level.

To make it possible to install the valve cone in the valve core, the valve core is a two-part valve core. The two parts of the valve core are fitted together in a telescopic manner.

The valve is actuated by means of a hydraulic drive. One decisive feature of the present invention is the use of clean water as hydraulic fluid to drive the steam control valve. The requirements of environmental protection and fire safety are met in a simple manner with this design.

A commercially available antifreeze is added to the clean water for units exposed to subzero temperatures.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
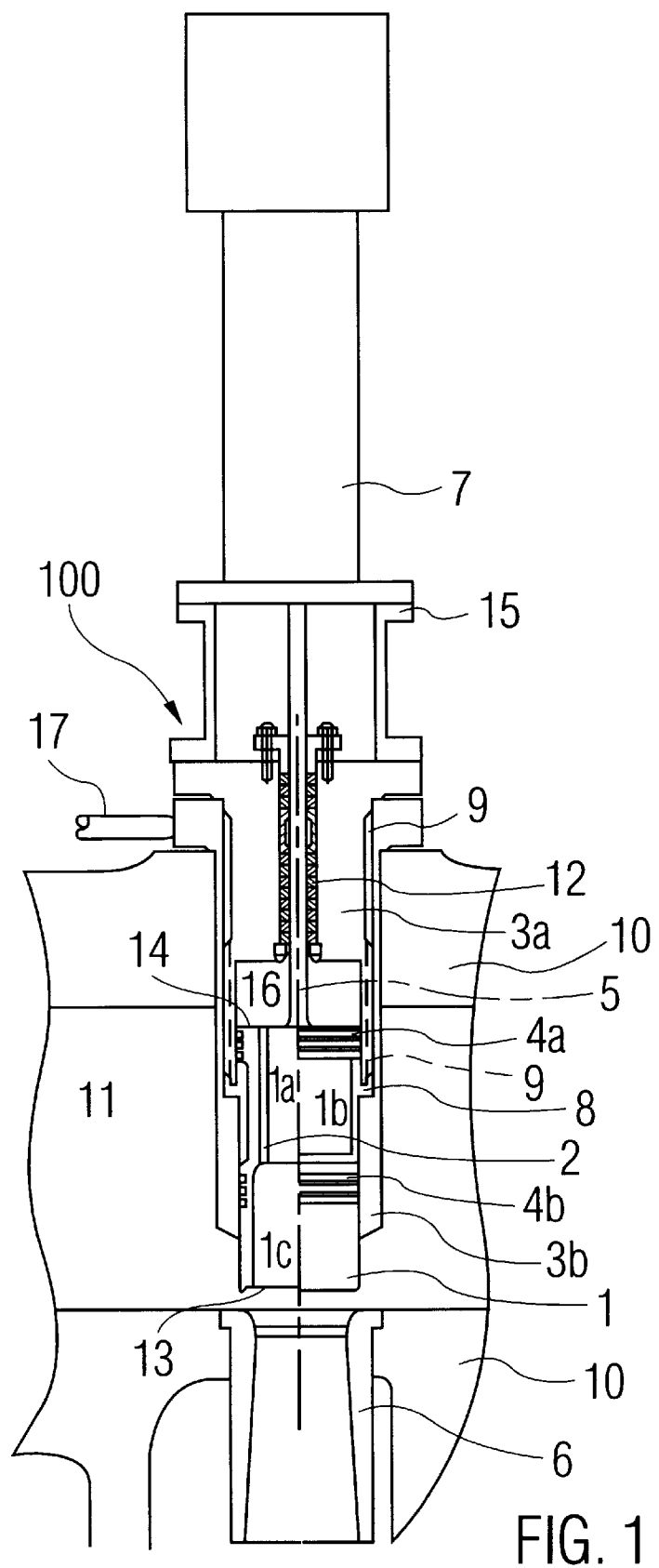
FIG. 1 is a sectional view through the control valve with hydraulic drive according to the invention.

Referring to the drawings in particular, the invention comprises a steam turbine steam control valve generally designated 100, shown in FIG. 1. FIG. 1 is based on a section through the control valve 100. A water-hydraulic drive 7 and the drive connection spacer 15 are provided as part of the arrangement, connected to a housing 10. A valve spindle 5 of a valve cone 1 is guided by a sealing packing 12, which is arranged in the upper part of the valve core 3a.

The valve core 3a and 3b and the valve diffusor 6 are detachably fastened in the valve housing 10. The lower part of the valve core 3b extends into the steam space 11. The valve core 3 is designed as a two-part valve core; it comprises the upper part 3a and the lower part 3b. Upper part 3a is pushed into lower part 3b and the two are screwed together to form the core 3.

The valve cone 1 slides, sealed by three piston rings 4, in the valve core parts 3a and 3b.

By means of longitudinal grooves and a turned groove, the valve core parts 3a and 3b pushed one into the other form at their point of separation a flow channel 9, which is designed as a suction channel for leaking steam. Separation flow channel 9 is connected to a suction line 17.

Axial through holes 2 are provided in the valve cone 1. A chamber 16, to which steam is admitted through the holes 2, is formed above the valve cone 1.

A chamber 8, is connected to the suction channel 9. Suction channel 9 provides communication between chamber 8 and suction line 17. Chamber 8 is formed between the valve cone 1 and the valve core 3a and 3b by the turned groove of the valve cone 1 in the middle area 1b.

Figure 2:
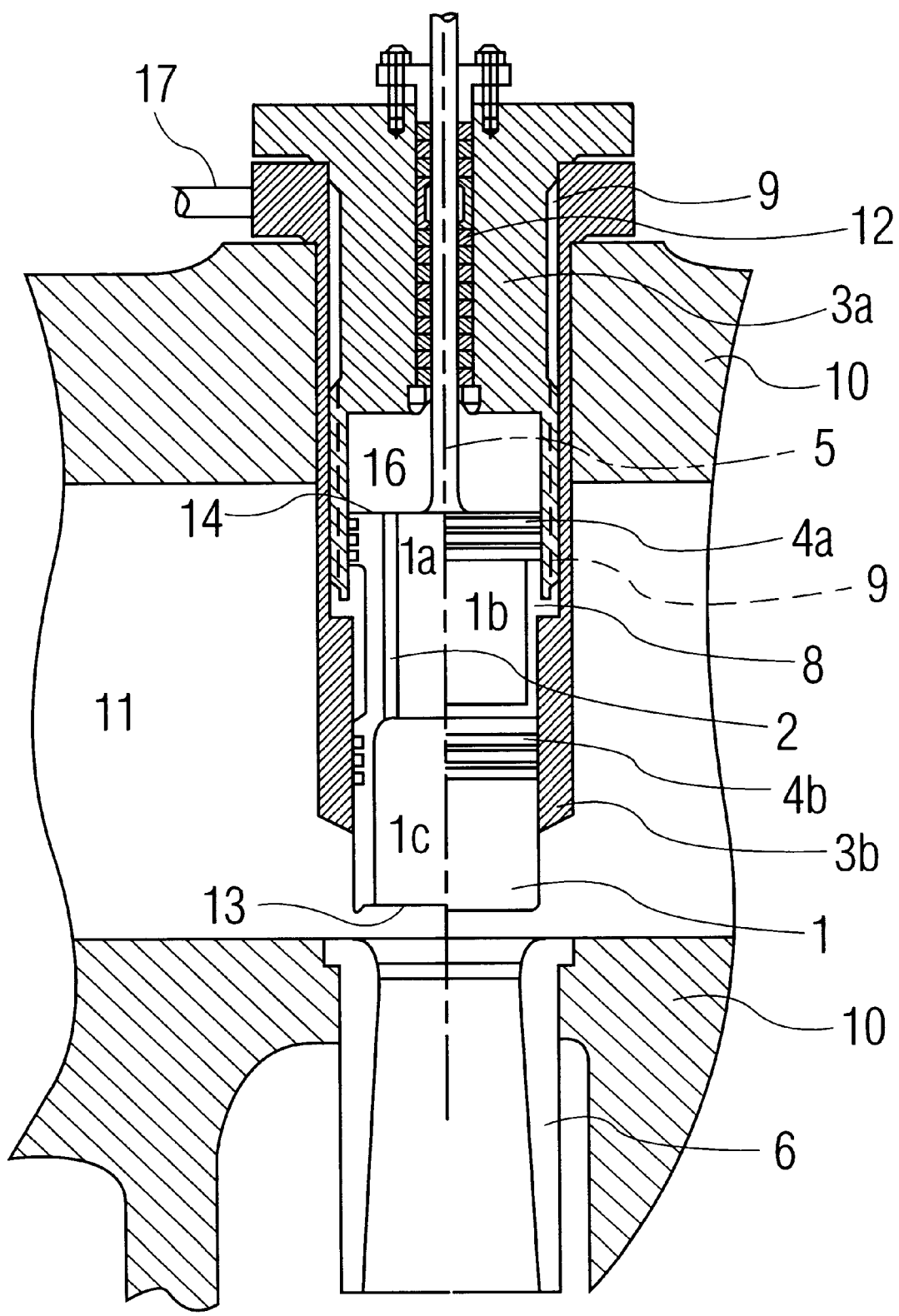
FIG. 2 is an enlarged sectional view through the control valve.

FIG. 2 shows a section through the control valve 100 on a larger scale, but without the water-hydraulic drive. The valve core 3a and 3b in the valve housing 10 is shown here by shading.

The valve cone 1 is fastened to a valve spindle 5. Pressure is admitted to both the upper area 14 and the lower area 13 of the valve cone 1a and 1c. With the valve closed, the lower area 13, to which pressure is admitted, is flush with the valve diffusor 6, which is inserted into the valve housing 10. The other features of FIG. 2 are identical with FIG. 1.

While a specific embodiment of the invention has been shown and described in detail to illustrate the application of the principles of the invention, it will be understood that the invention may be embodied otherwise without departing from such principles.

What is claimed is:

1. A steam turbine steam control valve, comprising:
    a valve housing having a valve diffuser;
    a valve core arranged in said valve housing, said valve core having and upper part and a lower part;
    a sealing packing disposed adjacent to said valve core;
    a valve spindle guided in said sealing packing;
    a valve cone connected to said valve spindle, said valve cone sliding in said valve core, said valve cone including an valve cone upper part and a valve cone lower part;
    a hydraulic drive connected to said valve spindle, said hydraulic drive including water as a hydraulic drive fluid;
    piston rings inserted in said valve cone upper part sliding in the said valve core upper part;
    additional piston rings inserted in said valve cone lower part sliding in the said valve core lower part, said valve cone having an upper surface area, to which pressure is admitted and said valve cone having a lower surface area, to which pressure is admitted, said upper surface area being substantially exactly the size of said lower surface area;
    an axial hole formed in said valve cone, said axial hole connecting said upper surface area and said lower surface area of the said valve cone, said valve cone having a middle part having a diameter smaller than a diameter of said valve cone upper part and said valve cone lower part, said middle part forming an annular chamber with the said valve core;
    a suction channel connected to said chamber; and
    a suction connection connected to said suction channel.

2. The steam control valve in accordance with claim 1, wherein said water is clean water and comprises a substantial part of said hydraulic drive fluid.

3. The steam control valve in accordance with claim 2, wherein an antifreeze is added to said clean water of said hydraulic drive.

4. The steam control valve in accordance with claim 2, wherein said valve cone, said valve core, and said valve housing, including said clean water hydraulic drive, may be arranged in any spatial position at the steam turbine or turbo engine.

5. A steam turbine/turbo engine arrangement, comprising:
    a steam control valve, comprising:
    a valve housing having a valve diffuser;
    a valve core arranged in said valve housing, said valve core having and upper part and a lower part;
    a sealing packing disposed adjacent to said valve core;
    a valve spindle guided in said sealing packing;
    a valve cone connected to said valve spindle, said valve cone sliding in said valve core, said valve cone including an valve cone upper part and a valve cone lower part;
    a hydraulic drive connected to said valve spindle, said hydraulic drive including water as a hydraulic drive fluid;
    piston rings inserted in said valve cone upper part sliding in the said valve core upper part;
    additional piston rings inserted in said valve cone lower part sliding in the said valve core lower part, said valve cone having an upper surface area, to which pressure is admitted and said valve cone having a lower surface area, to which pressure is admitted, said upper surface area being substantially exactly the size of said lower surface area;
    an axial hole formed in said valve cone, said axial hole connecting said upper surface area and said lower surface area of the said valve cone, said valve cone having a middle part having a diameter smaller than a diameter of said valve cone upper part and said valve cone lower part, said middle part forming an annular chamber with the said valve core;

a suction channel connected to said chamber; and a suction connection connected to said suction channel.

6. The steam turbine/turbo engine arrangement according to claim 5, wherein said water is clean water and comprises a substantial part of said hydraulic drive fluid.

7. The steam turbine/turbo engine arrangement according to claim 6, wherein an antifreeze is added to said clean water of said hydraulic drive.

8. The steam turbine/turbo engine arrangement according to claim 6, further comprising:

one of a steam turbine and turbo engine, wherein said valve cone, said valve core, and said valve housing, including said clean water hydraulic drive, may be arranged in any spatial position at the steam turbine or turbo engine.

9. The steam turbine/turbo engine arrangement according to claim 6, further comprising:

one of a steam turbine and turbo engine, wherein said valve cone, said valve core, and said valve housing, including said clean water hydraulic drive, are arranged in a spatial position above the steam turbine or turbo engine.

10. The steam turbine/turbo engine arrangement according to claim 6, further comprising:

one of a steam turbine and turbo engine, wherein said valve cone, said valve core, and said valve housing, including said clean water hydraulic drive, are arranged in a spatial position hanging below the steam turbine or turbo engine.

* * * * *